(12) United States Patent
Schlarb et al.

(10) Patent No.: US 9,610,752 B2
(45) Date of Patent: Apr. 4, 2017

(54) LAMINATED GLASS PANE WITH ELECTRICAL FUNCTION AND CONNECTION ELEMENT

(75) Inventors: Andreas Schlarb, Herzogenrath (DE); Walter Schreiber, Aachen (DE); Bernhard Reul, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 663 days.

(21) Appl. No.: 13/698,634

(22) PCT Filed: Jun. 20, 2011

(86) PCT No.: PCT/EP2011/060191
§ 371 (c)(1),
(2), (4) Date: Nov. 16, 2012

(87) PCT Pub. No.: WO2011/161039
PCT Pub. Date: Dec. 29, 2011

(65) Prior Publication Data
US 2013/0062119 A1    Mar. 14, 2013

(30) Foreign Application Priority Data
Jun. 22, 2010  (EP) .................................. 10401085

(51) Int. Cl.
*H01R 13/24*      (2006.01)
*H05B 3/84*       (2006.01)
(Continued)

(52) U.S. Cl.
CPC .. *B32B 17/10036* (2013.01); *B32B 17/10174* (2013.01); *B32B 17/10293* (2013.01);
(Continued)

(58) Field of Classification Search
CPC ........ B32B 17/10036; B32B 17/10174; B32B 17/10293; H01R 13/24; H01R 13/504;
(Continued)

(56) References Cited

U.S. PATENT DOCUMENTS 1,916,895 A * 7/1933 Rowe ........................... 219/203
2,648,754 A * 8/1953 Lytle ................. B32B 17/10036
                                                   219/541
(Continued)

FOREIGN PATENT DOCUMENTS

DE            9313394           10/1993
DE            9313394 U1        10/1993
(Continued)

OTHER PUBLICATIONS

Goerrer et al., Laminated car wishshield with wires and connecting cable embedded in its intermediate layer and its manufacturing method, Apr. 27, 1994, 26 pages.*
(Continued)

*Primary Examiner* — Quang D Thanh
*Assistant Examiner* — Kuangyue Chen
(74) *Attorney, Agent, or Firm* — Steinfl + Bruno LLP

(57) ABSTRACT

A laminated glass pane with electrical function and connection element is described. The laminated glass pane has at least two individual glass panes, which are areally connected to at least one thermoplastic intermediate layer. The laminated glass pane further has at least one electrically functional layer, which is situated between the at least two individual glass panes at least one foil conductor, which is electrically conductively connected to the at least one electrically functional layer, and at least one housing with at least one electrical feed line and at least one electrical line connection. The at least two individual glass panes has at least one undercut glass pane, wherein the at least one foil
(Continued)

Figure 1:
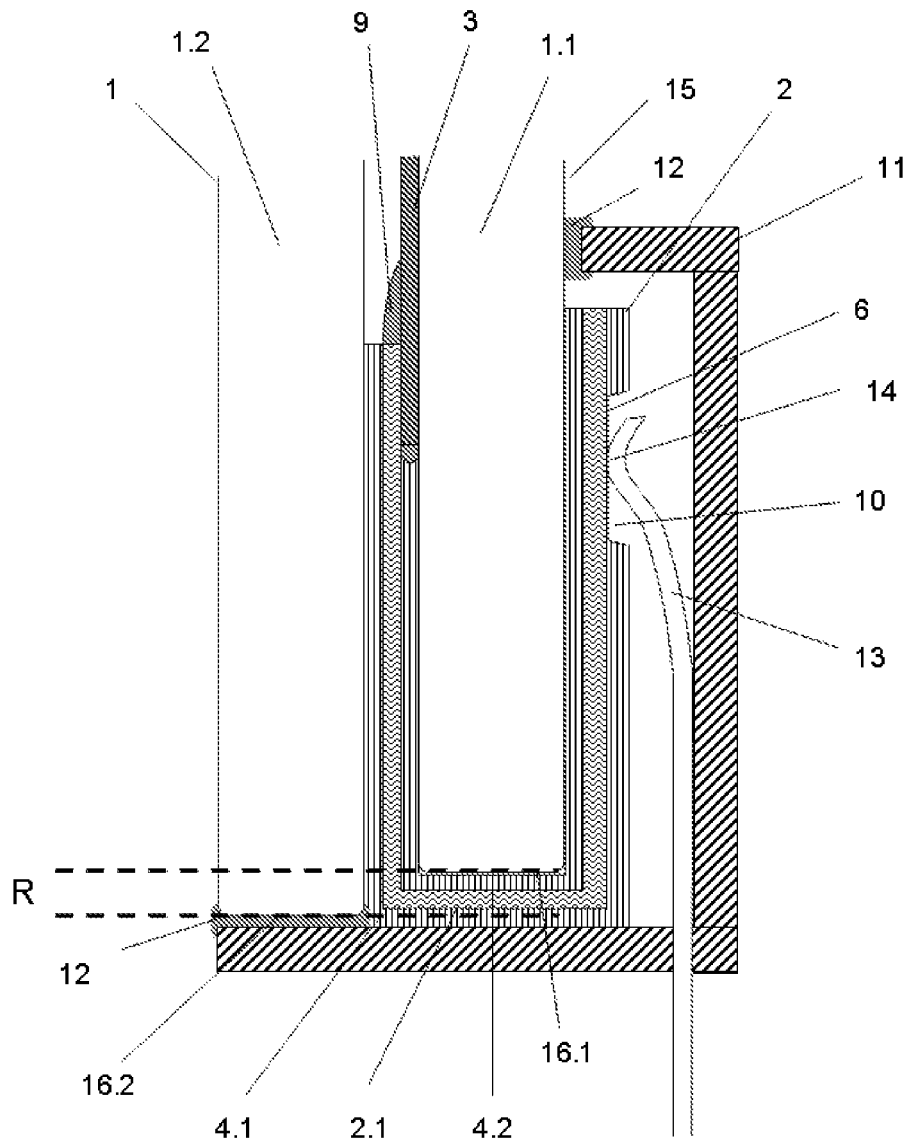

conductor runs without an overhang around a lateral edge of the at least one undercut glass pane.

26 Claims, 7 Drawing Sheets

(51) Int. Cl.
 *B32B 17/10* (2006.01)
 *H01R 13/504* (2006.01)

(52) U.S. Cl.
 CPC ......... *B32B 17/10761* (2013.01); *H05B 3/84* (2013.01); *H01R 13/24* (2013.01); *H01R 13/504* (2013.01); *H05B 2203/013* (2013.01); *H05B 2203/016* (2013.01); *Y10T 29/49155* (2015.01)

(58) Field of Classification Search
 CPC ................ Y10T 29/49155; H05B 3/84; H05B 2203/013; H05B 2203/016
 USPC .......................................... 219/200–203, 541
 See application file for complete search history.

(56) References Cited

U.S. PATENT DOCUMENTS

| | | | |
|---|---|---|---|
| 5,122,403 | A | 6/1992 | Roginski et al. |
| 5,624,591 | A * | 4/1997 | Di Trapani ................... 219/522 |
| 7,301,126 | B2 | 11/2007 | Mann |
| 7,663,561 | B2 | 2/2010 | Hisaeda |

FOREIGN PATENT DOCUMENTS

| | | |
|---|---|---|
| DE | 4235063 | 4/1994 |
| DE | 4235063 A1 | 4/1994 |
| DE | 19533761 | 3/1996 |
| DE | 19533761 A1 | 3/1996 |
| DE | 19960450 | 5/2001 |
| DE | 19960450 C1 | 5/2001 |
| DE | 10208552 | 2/2002 |
| DE | 10208552 A1 | 9/2003 |
| DE | 10241728 | 3/2004 |
| DE | 10353807 | 6/2005 |
| DE | 10353807 A1 | 6/2005 |
| DE | 10360255 | 7/2005 |
| DE | 10360255 A1 | 7/2005 |
| DE | 202004019286 | 4/2006 |
| DE | 202004019286 U1 | 4/2006 |
| EP | 0593940 A1 | 4/1994 |
| EP | 593940 A1 * | 4/1994 |
| EP | 0 593 940 B1 | 2/1998 |
| GB | 1033322 | 6/1966 |
| GB | 1033322 A | 6/1966 |
| JP | 47-4241 U | 9/1972 |
| JP | H02289452 A | 11/1990 |
| JP | 3-25526 U | 3/1991 |
| JP | H07206480 A | 8/1995 |
| JP | H1040977 A | 2/1998 |
| JP | 2001048602 A | 2/2001 |
| JP | 2005019083 A | 1/2005 |
| JP | 2006056751 A | 3/2006 |
| JP | 2010116699 A | 5/2010 |
| WO | 2006/100945 A1 | 9/2006 |

OTHER PUBLICATIONS

PCT International Search Report mailed on Aug. 31, 2011 for PCT/EP20101/060191 filed on Apr. 19, 2010 in the name of Saint-Gobain Glass France (German and English).
Office Action for Chinese Application No. 201180031106.2 filed Jun. 20, 2011 on behalf of Saint-Gobain Glass France. Issued Mar. 14, 2014 with English translation.
Office Action for Chinese Application No. 201180031106.2 filed Jun. 20, 2011 on behalf of Saint-Gobain Glass France. Issued Dec. 1, 2014 with English translation.
Office Action for Japanese Application No. 2013-515830 mailed Sep. 2, 2014 with English translation.
Office Action for Japanese Application No. 2013-515830 mailed Sep. 8, 2015 with English translation.
Written Opinion with English translation for International Application No. PCT/EP2011/060191 filed Jun. 20, 2011 on behalf of Saint-Gobain Glass France. Mailed Aug. 31, 2011.

* cited by examiner

LAMINATED GLASS PANE WITH ELECTRICAL FUNCTION AND CONNECTION ELEMENT

CROSS REFERENCE TO RELATED APPLICATIONS

The present application is the US national stage of International Application PCT/EP2011/060191 filed on Jun. 20, 2011, which, in turn, claims priority to European Patent Application EP 10401085.5 filed on Jun. 22, 2010.

The invention relates to a laminated glass pane with an electrical function, in particular a heating function, and a connection element for making electrical contact. The invention further relates to a method for producing such a laminated glass pane as well as its use.

Laminated glass panes, also referred to as composite glass panes, consist of two or more panes of float glass or single-pane safety glass and are fixedly bonded to each other with one or more intermediate layers using heat and pressure. The intermediate layers are usually made of thermoplastic plastics, such as polyvinyl butyral (PVB) or ethylene vinyl acetate (EVA).

Through the introduction an electrically functional component or an electrically functional layer between the glass panes, the laminated glass pane can be provided with various functions. The electrically functional components are, for example, antenna elements, solar cells, or electrochromic coatings. Through insertion of thin metal wires or application of an electrically heatable coating, a heating function can, in particular, be obtained.

In the automotive sector, foil conductors are customarily used for making contact with electrically functional layers in laminated glass panes. Examples of foil conductors are described in DE 42 35 063 A1, DE 20 2004 019 286 U1, and DE 93 13 394 U1.

Flexible foil conductors, sometimes also called flat conductors or flat-band conductors, are customarily made of a tinned copper strip with a thickness of 0.03 mm to 0.1 mm and a width of 2 mm to 16 mm. Copper has proved successful for such conductor tracks, since it has good electrical conductivity as well as good processability into foils. At the same time, material costs are low. Other electrically conductive materials that can be processed into foils can also be used. Examples for this are gold, silver, or tin and alloys thereof.

For electrical insulation and for stabilization, the tinned copper strip is applied to a carrier material made of plastic or laminated therewith on both sides. The insulation material contains, as a rule, a 0.025 mm to 0.05 mm thick polyimide-based film. Other plastics or materials with the required insulating properties can also be used. A plurality of conductive layers electrically isolated from each other can be situated in one foil conductor strip.

Foil conductors that are suitable for making contact of electrically functional layers in laminated glass panes have a total thickness of only 0.3 mm. Such thin foil conductors can be embedded without difficulty in the thermoplastic adhesive layer between the individual glass panes.

The use of foil conductors for making contact of electrically functional layers is not limited to only the automotive sector. As is known from DE 199 60 450 C1 and DE 102 08 552 A1, foil conductors are also used in the building sector. In composite or insulating glass panes, foil conductors serve for making electrical contact of integrated electrical components, such as voltage-controlled electrochromic layers, solar cells, heating wires, heating layers, or alarm loops.

Usually, a pane with a complete connection element and plug for toolless connection to another electrical control system is required from the pane manufacturer. The connection between the foil conductor and another electrical system is usually made by soft soldering and is protected by a housing.

Due to the small thicknesses of metal foil and of insulation foils, foil conductors have only slight protection against tearing and even less resistance to tear propagation. In practice, damage to the foil conductor occurs in particular at the point of exit from the laminated glass pane. This happens when the foil conductor is subjected to a tensile load via a glass edge or the foil conductor is twisted.

Fixing the transition between foil conductor and cable as close as possible to the pane or on the pane, as described in DE 42 35 063 A1, provides a remedy. There, the heating wires embedded in the intermediate layer of a composite glass pane make contact with a foil conductor. The foil conductor is led out of the laminate and around the outer edge of a glass pane of the laminate. Then, the foil conductor is adhesively bonded on the outer side of the glass and soldered to a flat connector or snap connector. The elements, such as flat connectors or snap connectors, protrude from the smooth surface of the glass and are vulnerable to damage.

In particular, in the automotive sector, the electrical line transitions to and from the foil conductor are usually soldered. Because of the low onboard voltage of 12 V to 14 V, with high currents as are required, for example, for a heating function, care must be taken to ensure low contact resistances at electrical line transitions.

An alternative connection device for electrically heatable plate elements made of glass is known from DE 102 41 728 A1. In this case, a recess in one of the glass panes with a projection catching from behind serves as a counter support for a fixing element made of plastic. The fixing element protrudes from the flat surface of the glass pane and the necessary hole drilling is a complex process step. The opening in the glass pane enables the penetration of oxygen and atmospheric moisture, a situation that can lead to corrosion of the sensitive heating layer. The protruding fixing elements are cumbersome and vulnerable to damage during transport as well as during assembly.

The object of the present invention consists in providing an improved laminated glass pane with an electrical function and with a connection element that is suitable for quick and simple assembly at the place of use. The integrity and the optical appearance of the laminated glass pane should be affected as little as possible by the connection element.

The object of the present invention is accomplished according to the invention by means of a laminated glass pane with an electrical function and a connection element in accordance with claim 1. Preferred embodiments emerge from the dependent claims.

A method for producing a laminated glass pane and making electrical contact by means of a plug-in system or adhesive system as well as a use of the laminated glass pane emerge from further claims.

The laminated glass pane according to the invention includes at least two glass panes, which are bonded to each other with at least one thermoplastic intermediate layer.

The glass panes are preferably made of tempered, partially tempered, or non-tempered glass, in particular float glass, cast glass, and ceramic glass. They have, preferably, thicknesses of 4 mm to 10 mm. The intermediate layers contain, preferably, thermoplastic plastics, such as polyvinyl butyral (PVB) or ethylene vinyl acetate (EVA) or multiple layers thereof, preferably with thicknesses of 0.3 mm to 0.8 mm.

Between the individual glass panes is situated at least one electrically functional layer, preferably an electrically heatable coating, an electrochromic or photovoltaic layer. Electrically heatable coatings contain, preferably, one or a plurality of layers of metal isolated from each other; they contain, particularly preferably, silver. The metal layers are preferably embedded in a dielectric material of the metal oxide type as a diffusion barrier.

In an advantageous embodiment of the laminated glass pane according to the invention, at least one electrically functional layer is situated on at least one of the inner sides of the glass panes. Here, "inner side of the glass pane" means any side facing the thermoplastic intermediate layer. In the case of a glass composite of more than two glass panes, even a plurality of electrically functional layers can be situated on a plurality of inner sides of the glass panes. Alternatively, one functional layer can be embedded between two thermoplastic intermediate layers.

The electrically functional layer is electrically conductively connected to a foil conductor. The connection is made preferably by clamping, soldering, or gluing using an electrically conductive adhesive.

The foil conductor is led out from the laminated glass pane and fixed on an outer side of the laminated glass pane. Here, "outer side of the laminated glass pane" means any side that is not situated in the interior of the laminated glass pane. This includes the side of the glass pane facing away from the thermoplastic intermediate layer as well as its peripheral edge surface. The foil conductor can even be fixed on both outer sides of the laminated glass pane, if, for example, it has two layers or is divided in its lengthwise direction.

The foil conductor has, on the outer side of the laminated glass pane, a connection location for making electrical contact. This is preferably a gap in the external plastic insulation of the foil conductor, such that the metallic inner conductor of the foil conductor is freely accessible to contact elements.

In a preferred embodiment of the invention, the connection location of the foil conductor is situated in a region of the peripheral edge surface of the glass pane. In this manner, a particularly aesthetic result is obtained since the regions of the laminated glass pane seen when looking through the pane have no external contact elements.

The present invention further includes at least one single- or multipart housing with an electrical feed line and a contact element to form an electrical line connection with the connection location of the foil conductor.

The housing is preferably made from an electrically insulating material. Thermoplastic plastics and elastomers that are processed by injection molding methods are appropriate for industrial production of the housing. Such injection molding methods for producing plastic housings are known from DE 103 53 807 A1. Used as thermoplastic plastics and elastomers are, for example, polyamide, polyoxymethylene, polybutylene terephthalate, or ethylene propylene diene rubber. Alternatively, hotmelt molding material such as acrylate or epoxy resin systems can also be used to produce the housing. The housing can be made of metal or of another electrically conductive material with electrically insulating inserts.

Preferably used as contact elements are contact pins or spring contact elements made of metal. For the preferred application objective in a surface heating element with relatively high operating voltages, only relatively low currents have to be carried, such that a solder-free, clamping connection suffices. Moreover, in the case of use in buildings, the contact location is usually exposed to no vibrations. If need be, the electrical line connection between contact elements can also be soldered, bonded, glued, or additionally secured.

The housing can serve as a base for a connection plug or a connection line. Moreover, it can accommodate further functional elements such as an electrical control system or a temperature sensor.

In a preferred embodiment of the invention, the laminated glass pane has an operating voltage of 90 V to 400 V, particularly preferably of 100 V to 250 V.

The housing is fixed on the outer side of the laminated glass pane by gluing and is sealed. The gluing takes place preferably by means of an adhesive strand or adhesive strip with an a acryl or polyurethane base. By means of the adhesive bonding, the interior of the housing can be hermetically sealed against gases, water, or moisture. This protects the contact location against corrosion.

Alternatively, the housing can be plug-in mounted on the glass pane. For this purpose, the housing preferably has a U-shaped profile such that the lateral edge of the laminated glass pane is clampingly surrounded. The clamped housing can be additionally sealed and secured by gluing.

In the present invention, at least one of the individual glass panes of the laminated glass pane composite has an undercut or is set back relative to the other glass pane. The undercut, i.e., the distance between the lateral edges of the individual glass panes, is preferably from 0.1 mm to 0.5 cm, particularly preferably from 0.1 mm to 0.5 mm. The undercut can extend over the width of the entire glass pane or only on a region around the point of exit of the foil conductor. The foil conductor runs in the region of the undercut around the lateral edge of the glass pane. It does not protrude and is largely protected from damage during transport and assembly.

The invention further includes a method for producing a laminated glass pane with electrical function and making electrical contact by means of a push-fit mounting and/or gluing system. In a first step, a foil conductor connected to the electrically functional layer is led out of a laminated glass pane and laid around the lateral edge of the glass pane. In a second step, the foil conductor is adhesively bonded on the outer side of the glass pane. The connection location of the foil conductor is situated on the side facing away from the glass pane. In a third step, a housing with at least one spring contact element is adhesively bonded onto the glass pane. Alternatively, the housing can also be clamped onto the laminated glass pane. In this process, the spring contact element in the housing comes into electrical contact with the connection location of the foil conductor.

In the case of a laminated glass pane that consists of two individual panes, the foil conductor can be laid around the lateral edge of one or the other individual pane. The foil conductor can be simultaneously laid around both lateral edges of the individual panes and adhesively bonded on their outer sides, if, for example, it has two layers or is divided in its lengthwise direction.

The position of the spring contact element in the housing is coordinated such that simple, perfectly fitting assembly with the connection location occurs. The housing can also be configured as a mounting bracket for the laminated glass pane, for example, as a rail that extends over the entire end face of the glass pane.

The invention further includes the use of the laminated glass pane as a functional and/or decorative individual piece and as a built-in part in furniture, devices, and buildings, as well as in means of transportation on land, in the air, or on water, in particular in motor vehicles, for example, as a windshield, rear window, side window, and/or glass roof. The laminated glass pane is preferably used as an electrical heating element.

The invention further includes the use of the laminated glass pane with a voltage of 90 V to 400 V applied to the electrically functional layer. Voltages in this range are available as normal household supply voltages and are particularly suitable for the operation of an optically transparent electrical heating element.

The invention is described in detail in the following with reference to drawings. The drawings are schematic representations and are not true to scale. In particular, the layer thicknesses of the foil conductor are significantly enlarged for their visualization. The drawings in no way restrict the invention.

Figure 2:
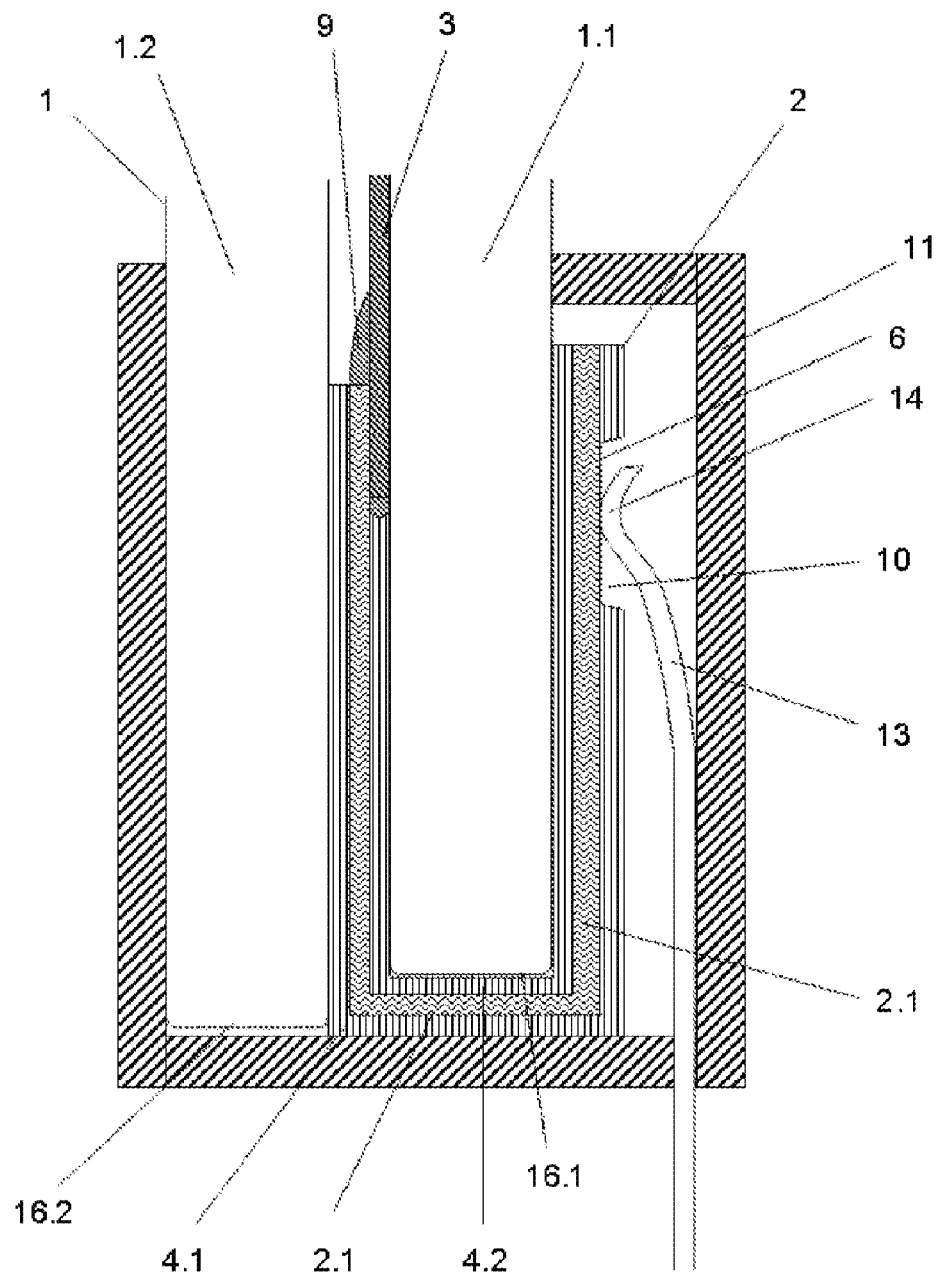
Figure 3:
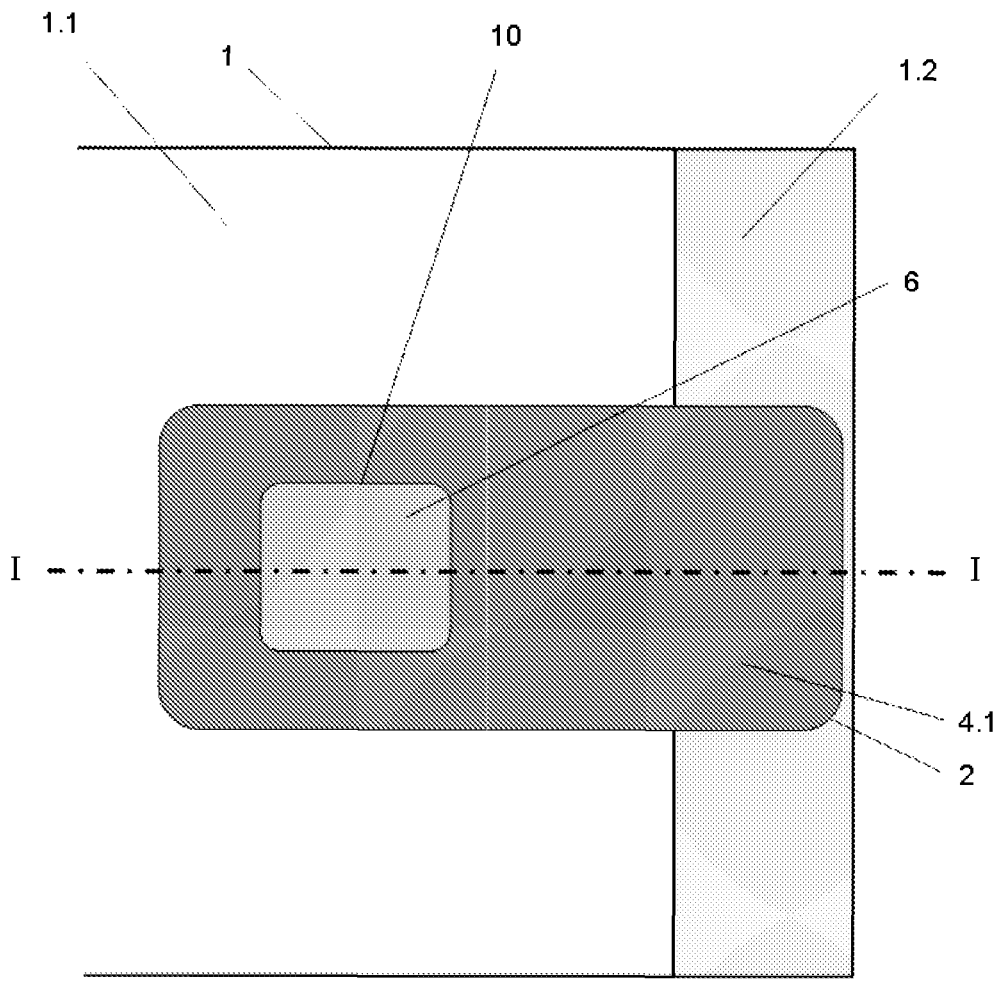
Figure 3A:
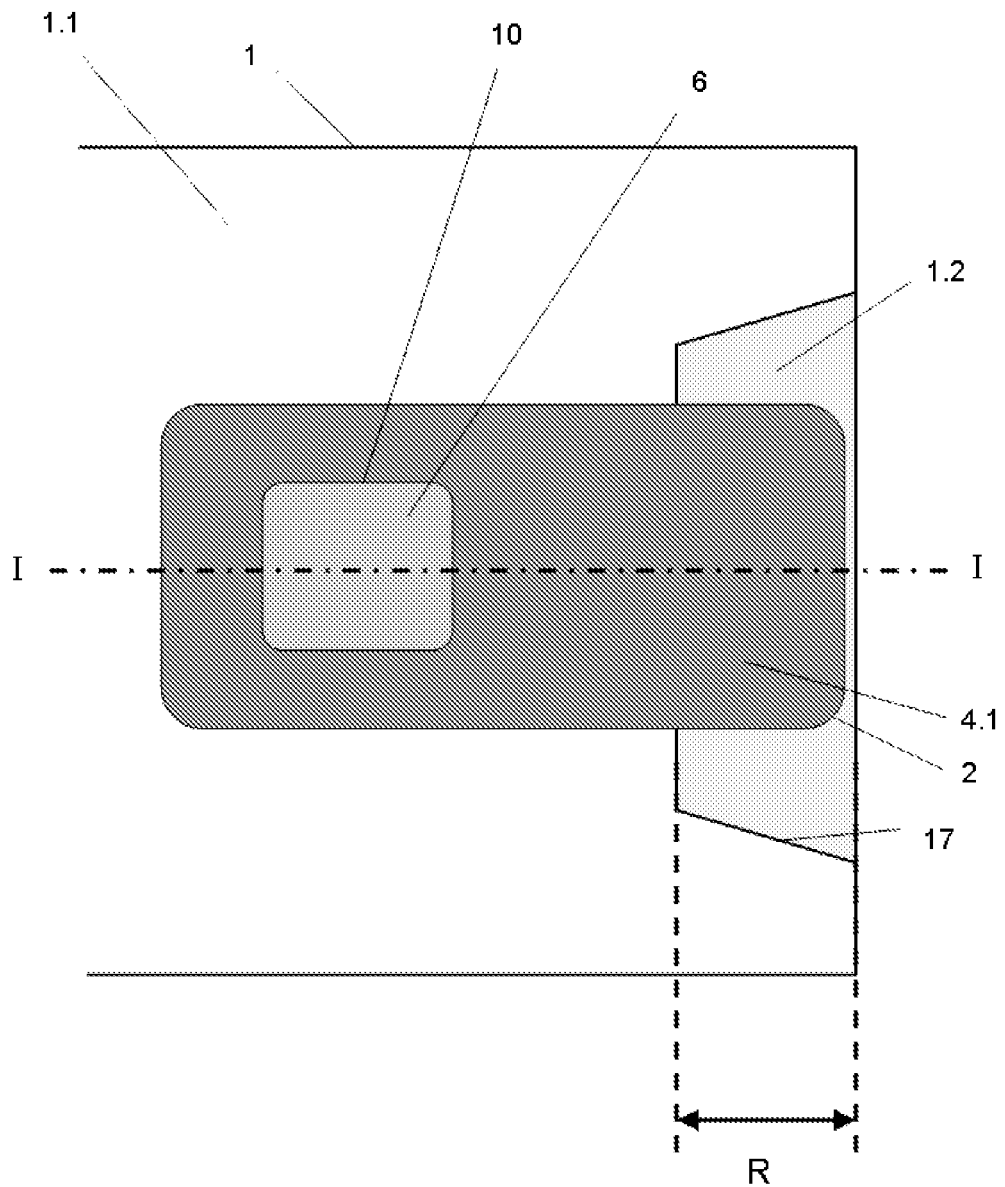
Figure 4:
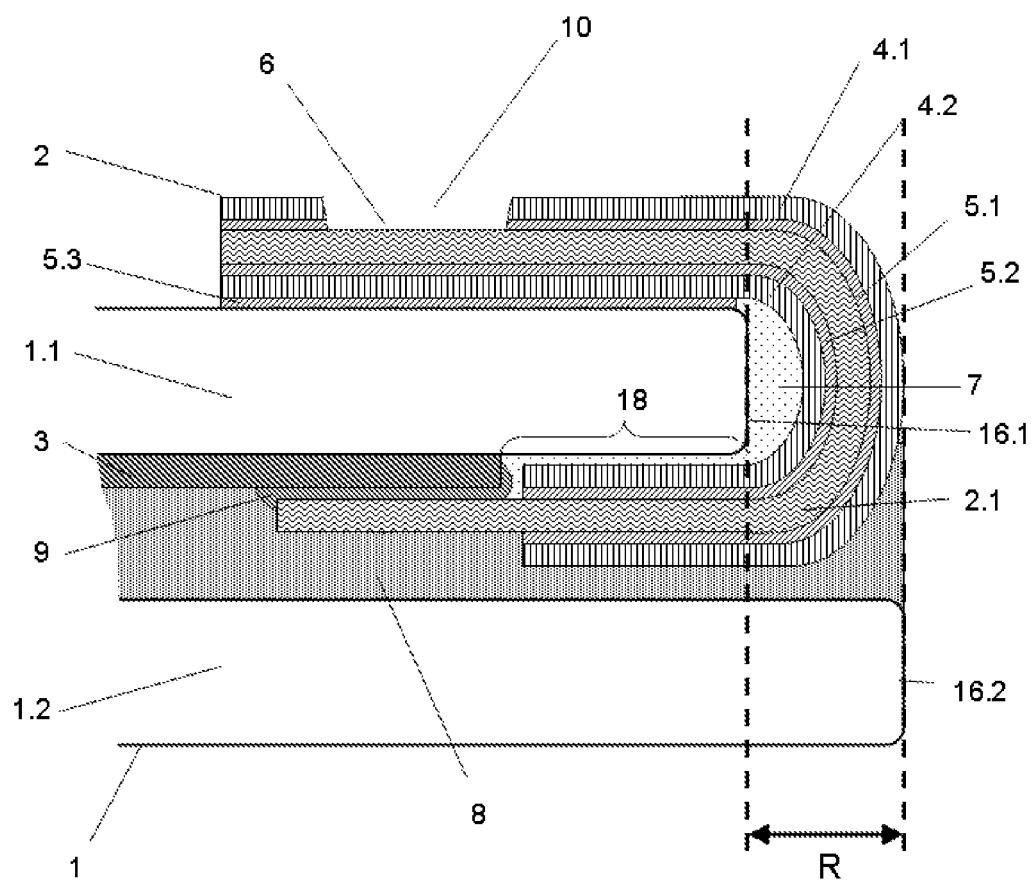
Figure 5:
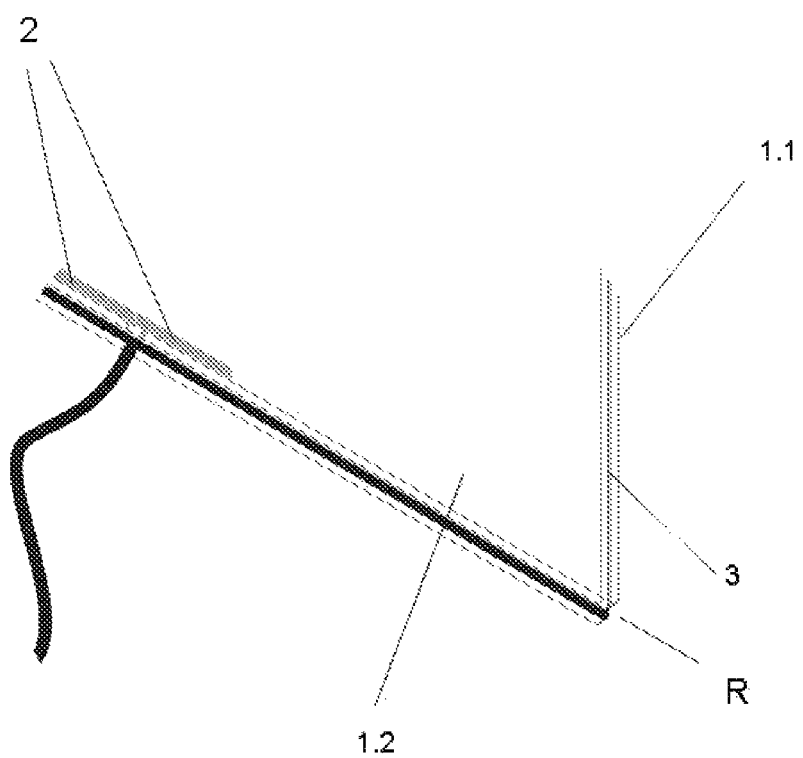
Figure 6:
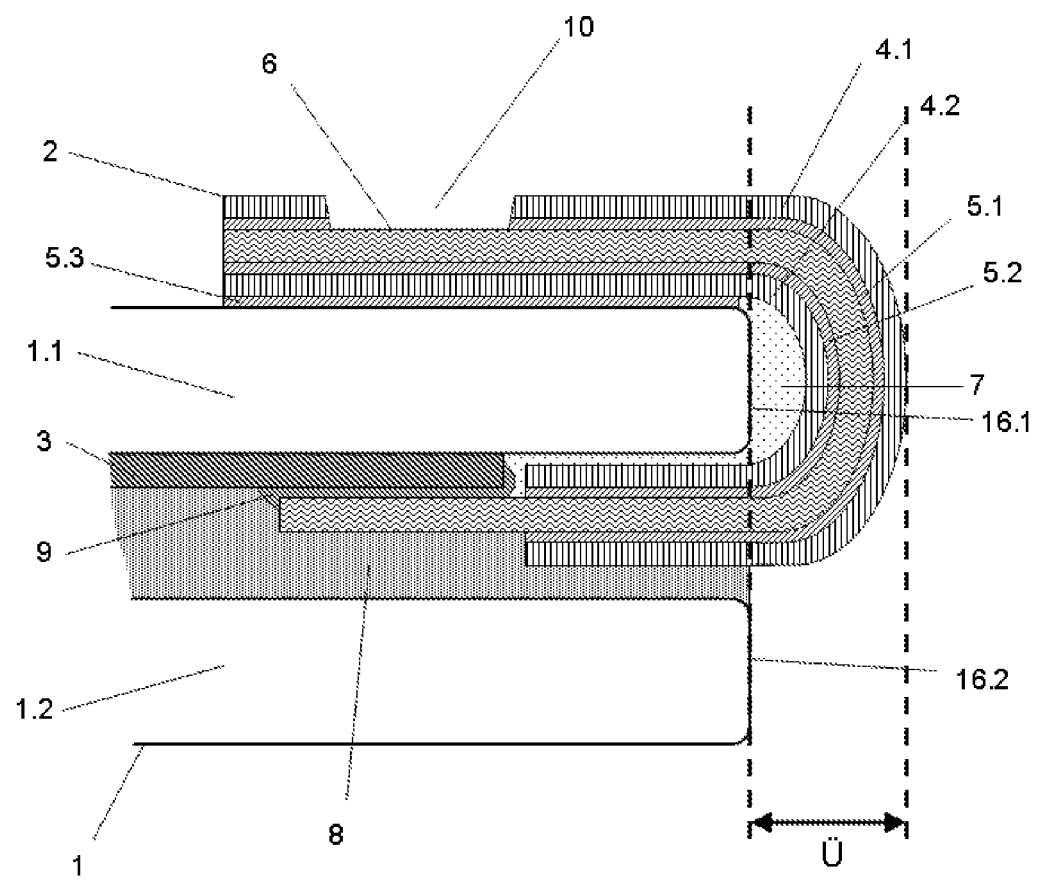

They depict:

FIG. 1 a laminated glass pane (1) with an adhesively bonded housing (11) and electrical contacting by means of a spring contact element (13), FIG. 2 a laminated glass pane (1) with a housing (11) push-fit mounted thereon and electrical contacting by means of a spring contact element (13), FIG. 3 a laminated glass pane (1) with a foil conductor (2) led out and an undercut in the upper glass pane (1.1) in a plan view, FIG. 3A a laminated glass pane (1) with a foil conductor (2) led out and a partial undercut in the upper glass pane (1.1) in a plan view, FIG. 4 a cross-sectional drawing along the line I-I of FIG. 3 through a laminated glass pane (1) with an electrically functional layer (3) and a foil conductor (2) led outward, FIG. 5 a perspective representation of a laminated glass pane (1) with the foil conductor (2) running inside the laminated glass pane (1), and FIG. 6 a cross-sectional drawing through a laminated glass pane (1) with a foil conductor (2) led outward without an undercut.

The following figures depict an embodiment of the laminated glass pane according to the invention (1) with a connection element using the example of a surface heating element.

FIG. 1 depicts a laminated glass pane (1) with an adhesively bonded housing (11) and electrical contacting by means of a spring contact element (13).

The individual glass panes (1.1) and/or (1.2) of the laminated glass pane (1) are made of partially tempered glass with a prestress of at least 70 MPa per DIN EN 1863. The individual glass panes (1.1) and/or (1.2) have a thickness of 4 mm to 10 mm and are bonded to each other with a thermoplastic intermediate layer. The thermoplastic intermediate layer is made of a polyvinyl butyral film (8) with a thickness of 0.76 mm. In the example depicted, an electrically heatable coating is applied on the side of the upper glass pane (1.1) facing the thermoplastic intermediate layer (8) as an electrically functional layer (3). The electrically heatable coating can equally possibly be applied on the side of the second glass pane (1.2) facing away from the thermoplastic intermediate layer, on both glass inner sides. The electrically heatable coating (3) is known from DE 102 08 552 A1 and consists of a silver layer that is embedded between two metal oxide layers.

The laminated glass pane (1) has, for example, areas of 0.4 m×0.6 m to 1 m×1.8 m. To fulfill the heating function, a supply voltage of 220 V to 240 V at 50 Hz to 60 Hz is applied to the electrically heatable coating (3). The heat output is from 800 W/m$^2$ to 1000 W/m$^2$. The operating temperature is a maximum of 60° C. b 70° C.

The electrically heatable coating (3) is electrically conductively connected (9) to the electrically conductive layer (2.1) of a foil conductor (2). The connection (9) occurs, for example, by means of soldering or gluing with an electrically conductive adhesive. The foil conductor (2) consists of a tinned copper strip (2.1) with a thickness of 0.03 mm to 0.1 mm and a width of, for example, 8 mm to 16 mm. The copper strip (2.1) is adhered on both sides to a plastic film (4.1) (4.2) made of polyimide adhesive layers (5.1) (5.2). The foil conductor (2) is, in addition, adhered to the surface (15) of the glass pane (1.1) with an adhesive layer (5.3).

The foil conductor (2) has a connection location (6) for making electrical contact. A gap (10) with a size of, for example, 0.5 cm×0.5 cm in the outer-positioned plastic film (4.1) is situated at the connection location (6). In the region of the gap (10), the tinned copper strip (2.1) of the foil conductor (2) is freely accessible.

The connection location (6) depicted in FIG. 1 is situated on the outer side of the glass pane (1.1) at a distance of roughly 2 cm from the lateral edge of the glass pane (1.1). However, the connection location (6) can be situated at any point of the outer side (15) of the glass pane (1.1) as well as on its lateral edge (16.1) itself.

In FIG. 1, the glass pane (1.1) is undercut or set back compared to the second glass pane (1.2) by a distance R of, for example, 3 mm. The foil conductor (2) runs in the space thus created. At its point of exit from the glass composite, the foil conductor (2) does not protrude beyond the second glass pane (1.2) and is protected from external mechanical stresses.

In the example shown here, the electrical line connection (14) to the connection location (6) of the foil conductor (2) is made via a spring contact element (13). The spring contact element (13) is connected to the power supply or to an external electrical control system, for example, a thermostat. The spring contact element (13) enables simple and quick contacting without additional steps such as soldering or gluing.

The housing (11) is designed with its spring contact element (13) such that it can be simply and quickly assembled. FIG. 1 depicts, by way of example, a housing (11) for adhesive bonding to the glass pane composite. The lateral edge (16.2) of the protruding glass pane (1.2) and the surface (15) of the glass pane (1.1) serve as an assembly stop. The position of the spring contact element (13) is coordinated such that an electrical contact (14) is made with the connection location (6) of the foil conductor (2).

FIG. 2 depicts a housing (11) that is push-fit mounted on the glass pane composite. In this case as well, the position of the spring contact element (13) is coordinated such that an electrical contact (14) is made with the connection location (6) of the foil conductor (2).

The laminated glass pane (1) is preferably produced with foil conductors (2) led out and fixedly glued to the glass surface (15). The housing (11) is not adhesively bonded or push-fit mounted on the laminated glass pane until after it reaches the assembly site.

With both housing variants, the possibility exists to first install the laminated glass pane (1) and to then attach the housing (11). Alternatively, the housing (11) can be installed first, for example, as a skirting board or wall rail. Then, the laminated glass pane (1) is inserted into the housing (11).

With use of the push-fit mountable housing variant of FIG. 2 together with a suitable rail system, the heatable glass element can even be built in so as to be movable or flexibly removable.

The gluing of the housing (11) to the glass panes (1.1) and (1.2) can, for example, be done with an acrylate adhesive or a polyurethane adhesive (12). In addition to the simple and durable connection between the housing (11) and the glass panes (1.1) and (1.2), these adhesives fulfill a sealing function and protect the electrical line connection (14) between the foil connector (2) and the contact element (13) against moisture and corrosion. By means of the sealing of the voltage carrying electrical conductor, the required electrical protection class of the electrical connection can, moreover, be obtained. This is, for example, essential for use in damp areas or bathrooms.

The electrically conductive layer (2.1) of the foil conductor (2) does not have to be bare metal at the connection location (6); instead, it can be coated with a protective layer of paint or a plastic film. This protective layer protects the metallic contact surface against oxidation and corrosion during production and transport to the place of use. The protective layer can be penetrated by an object to make contact, for example, by a contact pin or contact needle. Alternatively, the protective layer can be made from an adhesively bonded, peelable plastic film. The plastic film can already be applied during production. It can then be removed at the time of assembly before the actual electrical contact is made.

FIG. 3 is a plan view of a laminated glass pane (1) with a foil conductor (2) led out without a housing. The upper glass pane (1.1) has an undercut that extends over the entire edge (16.1) of the glass pane. FIG. 3A depicts an alternative embodiment, wherein the undercut (17) extends on a trapezoidal region around the point of exit of the foil conductor (2) out of the glass pane laminate.

FIG. 4 is a detailed depiction of the layer structure and of the foil conductor along the line I-I of FIG. 3. Since the electrically conductive coating (3) is vulnerable to oxidation and corrosion, it is usually not led all the way to the outer lateral edge (16.1) of the glass pane (1.1). The coating-free region (18) preferably has a width of 0.5 cm to 2 cm relative to the outer lateral edge (16.1) of the glass pane (1.1).

In the production process, the electrically conductive coating (3) is usually deposited on the entire glass pane (1.1). The stripping of the region (18) occurs in a second process step, for example, by means of laser ablation, plasma etching, or mechanical methods. Alternatively, masking techniques can be used.

The free space created is usually filled with a plastic material, for example, an acrylate adhesive as a vapor diffusion barrier (7). The hermetic sealing of the edge gap protects the corrosion sensitive electrically conductive coating (3) against atmospheric oxygen and moisture.

FIG. 5 is a perspective depiction of the course of the foil conductor (2) inside the glass composite. In this exemplary embodiment, the foil conductor (2) runs in the shape of an angle between the two glass panes (1.1) and (1.2) and is connected to the electrically heatable coating (3), for example, by soldering. Such shaping of the foil conductor (2) ensures a large contact surface between the coating (3) and the foil conductor (2) as well as optimized potential and heat distribution within the coating (3).

FIG. 6 is a cross-sectional depiction through a laminated glass pane (1) with an electrically functional layer (3) and a foil conductor (2) led out. The glass panes (1.1) and (1.2) are implemented in this case without an undercut or offset. The foil conductor (2) protrudes beyond the edges (16.1) and (16.2) of the glass panes (1.1) and (1.2) by a length Ü. In the protruding region Ü, the foil conductor (2) is particularly vulnerable to mechanical damage during transport and assembly.

REFERENCE CHARACTERS (1) laminated glass pane
(1.1), (1.2) glass pane
(2) foil conductor
(2.1) electrically conductive layer of (2)
(3) electrically functional layer, heating coating
(4.1), (4.2) electrically insulating foil
(5.1), (5.2), (5.3) adhesive layer
(6) connection location
(7) vapor diffusion barrier
(8) thermoplastic intermediate layer
(9) electrical line connection between (2.1) and (3)
(10) gap in (4.1)
(11) housing
(12) adhesive, sealing
(13) spring contact element, feed line
(14) electrical line connection between (2.1) and (13)
(15) outer side of (1.1)
(16.1) lateral edge of (1.1)
(16.2) lateral edge of (1.2)
(17) undercut, offset
(18) coating-free region
I-I section line
R distance of the undercut
Ü overhang

The invention claimed is:
1. A laminated glass pane comprising:
at least two individual glass panes;
at least one thermoplastic intermediate layer, which is situated between the at least two individual glass panes;
at least one electrically functional layer, which is situated between the at least two individual glass panes;
at least one foil conductor, which is electrically conductively connected to the at least one electrically functional layer,
wherein the at least one foil conductor is led out from the laminated glass pane,
wherein the at least one foil conductor is fixed on at least one outer side of the laminated glass pane, and
wherein the at least one foil conductor has, on the at least one outer side of the laminated glass pane, a connection location for making electrical contact;
a single-part housing;
wherein the at least two individual glass panes and at least one spring contact element are disposed in the single-part housing,
wherein the single-part housing is adhesively bonded or clamped on an outer side of at least one of the at least two individual glass panes,
wherein the at least one spring contact element is clamped to the connection location so as to make electrical contact with the at least one foil conductor when the single-part housing is adhesively bonded or clamped on an outer side of at least one of the at least two individual glass panes,
wherein a position of the at least one spring contact element is coordinated in the single-part housing to provide an assembly with the connection location of the at least one foil conductor, wherein at least one of the at least two individual glass panes has an undercut, and wherein the at least one foil conductor runs without an overhang around a lateral edge of the at least one of the at least two individual glass panes having the undercut.

2. The laminated glass pane according to claim 1, wherein the at least two individual glass panes contain partially tempered glass with a thickness of 4 mm to 10 mm, the at least one thermoplastic intermediate layer contains polyvinyl butyral with a thickness of 0.7 mm to 0.9 mm, and the at least one electrically functional layer contains at least one metal layer and at least one metal oxide layer.

3. The laminated glass pane according to claim 1, wherein the at least one electrically functional layer is situated on at least one inner side of the at least two individual glass panes.

4. The laminated glass pane according to claim 1, wherein the at least two individual glass panes have an undercut of 0.1 mm to 0.5 cm.

5. The laminated glass pane according to one of claim 1, wherein the at least one electrically functional layer is a heating layer.

6. The laminated glass pane according to one of claim 1, wherein an interior of the single-part housing is sealed against gases, water, or moisture by a sealing means.

7. The laminated glass pane according to claim 1, wherein the connection between the at least one electrically functional layer and the at least one foil conductor is adhesively bonded or clamped.

8. The laminated glass pane according to claim 1, wherein the connection location of the at least one foil conductor is situated on a side facing away from the at least two individual glass panes.

9. A method for producing the laminated glass pane, comprising:

introducing at least one foil conductor connected to at least one electrically functional layer into at least two individual glass panes;

laying the at least one foil conductor around a lateral edge of at least one of the at least two individual glass panes;

adhesively bonding the at least one foil conductor on an outer side of one of the at least two individual glass panes, wherein the at least one foil conductor includes a connection location at the outer side of one the at least two individual glass panes;

adhesively bonding or clamping a single-part housing onto at least one of the at least two individual glass panes, wherein at least one spring contact element is disposed in the single-part housing;

making electrical contact between the at least one spring contact element and the connection location of the at least one foil conductor when the single-part housing is bonded or clamped to the at least two individual glass panes; and coordinating a position of the at least one spring contact element in the single-part housing to provide an assembly with the connection location of the at least one foil conductor.

10. A method comprising:
providing laminated glass pane according to claim 1; and
applying a voltage of 90 V to 400 V to the at least one electrically functional layer of the laminated glass pane.

11. A method comprising:
providing laminated glass pane according to claim 1; and
using the laminated glass pane as a functional or decorative individual piece, as a built-in part in furniture, devices, or buildings, or as in means of transportation on land, in air, or on water.

12. A method comprising:
providing a laminated glass pane according to claim 1; and
using the laminated glass pane as an electrical heating element.

13. The laminated glass pane according to claim 4, wherein the at least two individual glass panes have an undercut within a range of 0.1 mm to 0.5 mm.

14. The method according to claim 10, wherein applying a voltage comprises the voltage applied to the at least one electrically functional layer is within a range of 100 V to 250 V.

15. The method according to claim 11, wherein using the laminated glass pane comprises the laminated glass pane is used as a windshield, rear window, side window, or glass roof.

16. The method according to claim 15, wherein using the laminated glass pane in the means of transportation comprises using the laminated glass pane in a motor vehicle.

17. The laminated glass pane according to claim 1, wherein the spring contact element comprises a feed line connected to a power supply or to an external electrical control system.

18. The method of producing a laminated glass pane according to claim 9, wherein the spring contact element comprises a feed line, and further comprising connecting the feed line to a power supply or to an external electrical control system.

19. The laminated glass pane according to claim 2, wherein at least one metal layer of the at least one electrically functional layer contains a silver layer.

20. The laminated glass pane according to claim 6, wherein the sealing means is an acryl-based or polyurethane-based adhesive.

21. The laminated glass pane according to claim 1, wherein the single-part housing covers a portion of the at least one foil conductor that is led out from the laminated glass plane, and wherein the single-part housing further covers a portion of the at least one foil conductor that is fixed on at least one outer side of the laminated glass pane.

22. The method of producing a laminated glass pane according to claim 9, wherein adhesively bonding or clamping the single-part housing includes covering a portion of the at least one foil conductor extending around the lateral edge of at least one of the at least two individual glass panes, and includes covering a portion of the at least one foil conductor bonded on the outer side of one of the at least two individual glass panes.

23. The laminated glass pane according to claim 1, wherein the single-part housing is a U-shaped structure that covers the lateral edges of the at least two individual glass panes, a portion of the outer side of the laminated glass pane, and the connection location of the at least one foil conductor.

24. The laminated glass pane according to claim 1, wherein the single-part housing is an L-shaped structure that covers the lateral edges of the at least two individual glass panes and the connection location of the at least one foil conductor.

25. The laminated glass pane according to claim 1, wherein the at least one spring contact element includes a single conductive member with at least one curve or bend, whereby the coordination of the single conductive member inside of the single-part housing electrically connects the at least one curve or bend of the conductive member to the at least one foil conductor at the connection location.

26. A laminated glass pane comprising:
   at least two individual glass panes;
   at least one thermoplastic intermediate layer, which is situated between the at least two individual glass panes;
   at least one electrically functional layer, which is situated between the at least two individual glass panes;
   at least one foil conductor, which is electrically conductively connected to the at least one electrically functional layer,
      wherein the at least one foil conductor is led out from the laminated glass pane,
      wherein the at least one foil conductor is fixed on at least one outer side of the laminated glass pane, and
      wherein the at least one foil conductor has, on the at least one outer side of the laminated glass pane, a connection location for making electrical contact;
   at least one housing;
      wherein the at least two individual glass panes and at least one spring contact element are disposed in the housing,
      wherein the at least one housing is adhesively bonded or clamped on an outer side of at least one of the at least two individual glass panes,
   wherein the at least one spring contact element is clamped to the connection location so as to make electrical contact with the at least one foil conductor when the at least one housing is adhesively bonded or clamped on an outer side of at least one of the at least two individual glass panes,
   wherein a position of the at least one spring contact element is coordinated in the at least one housing to provide an assembly with the connection location of the at least one foil conductor,
   wherein the at least one spring contact element includes a single conductive member with at least one curve or bend, whereby the coordination of the single conductive member inside of the single-part housing electrically connects the at least one curve or bend of the conductive member to the at least one foil conductor at the connection location,
   wherein at least one of the at least two individual glass panes has an undercut, and
   wherein the at least one foil conductor runs without an overhang around a lateral edge of the at least one of the at least two individual glass panes having the undercut.

* * * * *